United States Patent
Lübbert et al.

(10) Patent No.: US 10,822,774 B2
(45) Date of Patent: Nov. 3, 2020

(54) AIRCRAFT COMPRISING A HIGH-PRESSURE WATER SUPPLY AND DISTRIBUTION SYSTEM

(71) Applicant: Airbus Operations GmbH, Hamburg (DE)

(72) Inventors: Tim Lübbert, Hamburg (DE); Axel Schreiner, Hamburg (DE); Michael Rempe, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 41 days.

(21) Appl. No.: 15/945,254

(22) Filed: Apr. 4, 2018

(65) Prior Publication Data
US 2018/0291595 A1    Oct. 11, 2018

(30) Foreign Application Priority Data

Apr. 7, 2017 (DE) .......................... 10 2017 107 558

(51) Int. Cl.
*E03B 7/07* (2006.01)
*B64D 11/02* (2006.01)
(Continued)

(52) U.S. Cl.
CPC .............. *E03B 7/075* (2013.01); *B64D 11/02* (2013.01); *B64D 11/04* (2013.01); *E03B 7/04* (2013.01);
(Continued)

(58) Field of Classification Search
CPC ........... B64D 11/02; B64D 11/04; E03B 7/04; E03B 7/075; E03B 7/09; E03B 14/06; E03B 11/06; G05D 16/08; Y02T 50/46
See application file for complete search history.

(56) References Cited

U.S. PATENT DOCUMENTS 3,596,588 A * 8/1971 Moss ..................... A47J 31/005
                                                            99/282
5,062,456 A * 11/1991 Cooke .................... F16L 11/088
                                                            138/125
(Continued)

FOREIGN PATENT DOCUMENTS

DE          4227516 A1    4/1993
DE    10 2011 109 943 A1    2/2013
(Continued)

OTHER PUBLICATIONS

German Search Report for Application No. 102017 107 558 dated Apr. 7, 2017.
(Continued)

*Primary Examiner* — Kevin F Murphy
*Assistant Examiner* — Jonathan J Waddy
(74) *Attorney, Agent, or Firm* — Jenkins, Wilson, Taylor & Hunt, P.A.

(57) ABSTRACT

An aircraft with a drinking water supply and distribution system including a water storage tank, a consumer equipment, a pressurizer, a pressure reducer and a conduit system connecting the drinking water storage tank to the consumer equipment via the pressurizer and supplying water from the at least one water storage tank to the at least one consumer equipment. The pressurizer pressurizes water in the conduit system with a peak pressure exceeding a supply water pressure threshold. The conduit system includes flexible conduits having a maximum internal diameter of less than 8 mm. The pressure reducer is provided for reducing the pressure of water supplied to the consumer equipment below a consumer water pressure threshold. The supply water pressure threshold exceeds the consumer water pressure threshold.

20 Claims, 2 Drawing Sheets

(51) Int. Cl.
  *B64D 11/04* (2006.01)
  *E03B 7/04* (2006.01)
  *E03B 7/09* (2006.01)
  *E03B 11/06* (2006.01)
  *G05D 16/08* (2006.01)

(52) U.S. Cl.
  CPC ............... *E03B 7/09* (2013.01); *E03B 11/06* (2013.01); *G05D 16/08* (2013.01); *Y02T 50/46* (2013.01)

(56) References Cited

U.S. PATENT DOCUMENTS

| | | | | |
|---|---|---|---|---|
| 5,261,440 A | * | 11/1993 | Frank | B64D 11/02 137/208 |
| 5,303,739 A | * | 4/1994 | Ellgoth | B64D 11/00 137/209 |
| 5,305,792 A | * | 4/1994 | Ellgoth | B64D 11/00 137/236.1 |
| 5,309,938 A | * | 5/1994 | Ellgoth | B64D 11/00 137/334 |
| 8,501,013 B2 | * | 8/2013 | Guttau | B01D 61/145 210/136 |
| 2004/0057709 A1 | * | 3/2004 | Leary | F24H 1/105 392/486 |
| 2004/0194830 A1 | * | 10/2004 | Honeyman | E03B 7/04 137/563 |
| 2005/0016593 A1 | * | 1/2005 | Ephrat | G05D 16/2086 137/488 |
| 2006/0169645 A1 | | 8/2006 | Hsueh | |
| 2008/0087039 A1 | * | 4/2008 | Reed | B64D 11/02 62/498 |
| 2010/0221642 A1 | | 9/2010 | Frahm et al. | |
| 2012/0111432 A1 | | 5/2012 | Harr et al. | |
| 2012/0151666 A1 | * | 6/2012 | Dannenberg | B64D 11/02 4/321 |
| 2013/0000735 A1 | * | 1/2013 | Blaze | E03B 7/075 137/1 |
| 2013/0199626 A1 | | 8/2013 | Teng | |
| 2014/0059754 A1 | * | 3/2014 | Hermon | B64D 11/02 4/318 |
| 2014/0102553 A1 | * | 4/2014 | Burd | F16K 24/042 137/315.01 |
| 2014/0158242 A1 | * | 6/2014 | Schreiner | B64D 11/02 137/899.2 |
| 2014/0166566 A1 | * | 6/2014 | Schreiner | B64D 11/02 210/251 |
| 2015/0368886 A1 | | 12/2015 | Waudoit | |
| 2019/0010681 A1 | * | 1/2019 | Shi | E03B 7/04 |

FOREIGN PATENT DOCUMENTS

DE  10 2014 109 997 A1  2/2016
WO  WO 2014/055785 A1  4/2014

OTHER PUBLICATIONS

Extended European Search Report for Application No. 18164717.3 dated Jun. 20, 2018.
European Office Action for Application No. 18164717.3 dated Dec. 17, 2019.

\* cited by examiner

AIRCRAFT COMPRISING A HIGH-PRESSURE WATER SUPPLY AND DISTRIBUTION SYSTEM

CROSS-REFERENCE TO RELATED APPLICATION

This application claims priority to German Patent Application No. 10 2017 107 558.5 filed Apr. 7, 2017, the entire disclosure of which is incorporated by reference herein.

TECHNICAL FIELD

The present disclosure relates to an aircraft comprising a water supply and distribution system.

BACKGROUND

Water supply and distribution systems are provided on all passenger aircraft. They are used to distribute fresh water from a water storage tank to all kinds of consumer equipment. Examples of consumer equipment that is supplied with fresh water are washbasins or flushes in the aircraft lavatory or kitchen sinks in aircraft galleys.

A prior art water supply and distribution system is described in DE 42 27 516 A1. The system comprises a water storage tank connected to consumer equipment by an arrangement of water pipework. The water in the pipework is pressurized up to a consumer water pressure threshold such that water can be directly taken from the pipework at the washbasins or kitchen sinks. Since distances of 60 m or more have to be covered in aircraft and sufficient water has to be supplied even at distances that are far from the drinking water storage tank, the pipework requires a sufficiently large internal diameter or cross-section. Using pipework with a large diameter also has the advantage that the pressure drop along the length of the pipework is rather small. Therefore, it is not necessary to use multiple pumps across the supply and distribution system to keep the water pressure sufficiently high.

The pipework for water supply and distribution systems is commonly arranged beneath the floor of the passenger cabin. Here generally sufficient space is available to provide the pipework with a continuous slope to enable draining. However, since many other elements also need to be installed in the area below the passenger cabin, the actual space available for routing the pipework is very limited. Given that the pipework has to be provided with a continuous slope for drainage purposes, the design of the layout of the pipework has proven to be a cumbersome and complex process in the past. Drainage of the pipework is required as the rigid pipes may burst if the water in them freezes.

SUMMARY

In view of the above it is an object of the disclosure herein to provide an improved water supply and distribution system taking into account the generic problems of such water supply and distribution systems. This object is achieved at least in part by a water supply and distribution system and an aircraft having features disclosed herein.

In a first aspect the problem is solved according to the disclosure herein by an aircraft with a drinking water supply and distribution system comprising at least one water storage tank, at least one consumer equipment, at least one pressurizer, at least one pressure reducer and a conduit system. The conduit system connects the at least one water storage tank to the at least one consumer equipment via the at least one pressurizer and is adapted or configured to supply water from the at least one water storage tank to the at least one consumer equipment. The at least one pressurizer is provided for pressurizing water in the conduit system, wherein a peak pressure of water in the conduit system exceeds a supply water pressure threshold. The conduit system comprises flexible conduits having a maximum internal diameter of less than 8 mm. Each of the at least one consumer equipment is associated with one of the at least one pressure reducer. The at least one pressure reducer is provided for reducing the pressure of water supplied by the conduit system to an associated consumer equipment such that the pressure does not exceed a consumer water pressure threshold. The supply water pressure threshold exceeds the consumer water pressure threshold.

In other words according to the disclosure herein instead of conventional large diameter low pressure supply pipework a conduit system comprising flexible conduits formed by flexible tubes or flexible hoses is used in the aircraft. The flexible conduits are preferably made from a plastic material, for example, polyether ether ketone (PEEK). The flexible conduits of the conduit system have a maximum internal diameter or open cross section of 8 mm or less and preferably a maximum internal diameter of 7 mm or less, more preferably a maximum internal diameter of 6 mm or less, more preferably a maximum internal diameter of 5 mm or less, even more preferably a maximum internal diameter of 4 mm or less and most preferably of 3 mm or less. Since such a conduit system results in a drop of pressure along the length of the flexible conduits, a higher peak water pressure in the part of the conduit system comprising the flexible conduits is required. A peak water pressure or peak pressure is the maximum pressure in a conduit system. In a preferred embodiment, the peak pressure exceeds a supply water threshold of 50 bar, preferably 100 bar and even more preferably 150 bar. A higher pressure in the conduit system makes it possible to supply sufficient quantities of water at the consumer equipment in a given time even if distances of, for example, 60 m or more have to be covered between a water storage tank and the consumer equipment.

Since the water supplied at the outlet of the consumer equipment, e.g., a kitchen sink of a galley, a wash basin or a flush of a lavatory, may not exceed a consumer water pressure threshold, each consumer equipment is associated with a pressure reducer which reduces the pressure of water in the conduit system down to or below the consumer water pressure threshold. It is possible that more than one consumer equipment is associated with the same pressure reducer, i.e., two adjacent wash basins may be supplied with water from the conduit system via the same pressure reducer. The consumer water pressure threshold is preferably 8.6 bar or less, more preferably 7 bar or less, more preferably 6 bar or less, more preferably 5 bar or less, more preferably 4 bar or less, more preferably 3 bar or less and most preferably 2.75 bar or less.

In an exemplary embodiment the supply water pressure threshold exceeds the consumer water pressure threshold at least by a factor of 5, more preferably at least by a factor 10 and most preferably at least by a factor of 20. Preferably, the supply water pressure threshold exceeds the consumer water pressure threshold by a factor in the range of 5 to 50. Compared to existing water supply and distribution systems for aircraft the system according to the disclosure herein makes the use of rigid large diameter pipes obsolete. Instead lightweight flexible conduits are used. Such conduits have the advantage that they reduce the overall weight of the system. Further, since the weight of the conduits including the water in the conduits is lower, the mounting brackets required for installing the conduits in the aircraft are smaller and of lower weight. Further, the flexible conduits also allows a more flexible installation of the conduit system since the flexible conduits can be bent and twisted with small radii of curvature. Another advantage of the flexible conduits is that due to their flexibility the conduits are less prone to damages if the water in them should freeze since the flexible conduits simply expand with the freezing water. Therefore, it is not necessary to provide the flexible conduits with a continuous slope for drainage. This drastically reduces the design effort required to adapt the conduit system to changes in the cabin or equipment layout. Furthermore, even if the water in the flexible conduits freezes, it may thaw or unfreeze in a short time, e.g., within 30 min at 10° C. environmental temperature due to the small diameter of the conduits. Hence, no heating solely dedicated to the flexible conduits of the conduit system is required.

Using flexible conduits also has the advantage the conduits can be provided as endless or coiled material which is cut into the required pieces during the installation process. It is not necessary to prepare exactly matching metal pipes before manufacturing and installation of the water supply and distribution system in the aircraft. This reduces the cost of manufacturing and installing the conduit system in an aircraft.

Finally, using a conduit system comprising flexible conduits also makes the design process simpler. Once a baseline design of the routing has been prepared, it is easily possible to change the routing of individual elements of the conduit system if the overall configuration of the aircraft changes. Furthermore, the use of flexible conduits has the advantage that the conduits do not need to be provided with a continuous slope which also reduces the design constraints.

In a preferred embodiment at least one of the at least one pressure reducer comprises a buffer. The buffer of the at least one pressure reducer is provided for storing water supplied by the conduit system from the at least one water storage tank at a pressure below the consumer pressure threshold. Water stored in the buffer of the at least one pressure reducer is supplied to the at least one consumer equipment associated with the at least one pressure reducer at a pressure not exceeding the consumer water pressure threshold.

Hence, in the preferred embodiment one or more of the pressure reducers additionally comprises a buffer for locally storing drinking water. The buffer stores a limited amount of drinking water locally such that for a limited amount of time more water can be supplied to consumer equipment associated with the pressure reducer than available through the conduit system at the same time. Thereby, temporal peaks in the water consumption can be locally absorbed.

Alternatively or additionally at least one of the at least one consumer equipment comprises a buffer. The buffer is provided for storing water supplied by the conduit system from the at least one water storage tank and water is stored in the buffer of the at least one consumer equipment at a pressure not exceeding the consumer water pressure threshold. Locating the buffer directly at the consumer equipment is in particular advantageous if more than one consumer equipment is associated with one pressure reducer since multiple small buffers can be provide instead of one large buffer. Preferably no means or mechanism is provided for actively heating the flexible conduits of the conduit system, whereby the installation and maintenance effort is reduced. Further, the power consumption is also reduced.

In a preferred embodiment the conduit system comprises a drainage valve and is connected to a high pressure gas source, wherein pressurized gas from the high pressure gas source can be fed into the conduit system for draining the conduit system. Thus, in the preferred embodiment a pressurized gas such as bleed air is provided. The gas is fed into the system for displacing any water from the narrow flexible conduits. The drainage valve may be formed by consumer equipment, for example, a kitchen sink.

The at least one pressurizer preferably comprises a low pressure stage and a high pressure stage, wherein the low pressure stage is provided for pressurizing water fed to the high pressure stage. In a preferred embodiment the low pressure stage is formed by a low pressure pump and a conduit loop. The conduit loop is adapted or configured to allow a circular flow in a flow direction from the drinking water storage tank through the low pressure pump into the drinking water storage tank. The high pressure stage of the at least one pressurizer branches off from the conduit loop at a feed point arranged in the flow direction between the low pressure pump and the drinking water storage tank. Using a low pressure stage allows feeding pre-pressurized water to the high pressure stage of the pressurizer which may reduce the loads on the high pressure stage.

The low pressure stage preferably comprises a flow restrictor. The flow restrictor is arranged in the conduit loop in the flow direction behind the feed point for restricting the flow of water in the conduit loop between the feed point and the drinking water storage tank. By the flow restrictor advantageously the low pressure level can be adapted or configured to improve performance of the cross-flow filtration or provide sufficiently pressurized water for the high pressure stage.

It is further preferred embodiment the low pressure stage comprises filtration for filtering the water before the water is fed from the low pressure stage to the high pressure stage. Thereby, damages in the high pressure stage due to particles in the drinking water can be prevented. Further, if the filtration is combined with a conduit loop and arranged at the feed point of the high pressure stage of the pressurizer, preferably cross-flow filtration may be used which prevents filter cake formation.

In a preferred embodiment the water supply system comprises a low pressure section and a high pressure section. The high pressure section of the water supply system is formed by the conduit system. The low pressure section of the water supply system comprises a low pressure pipework connecting the at least one water storage tank to at least one consumer equipment, wherein the at least one consumer equipment connected to the at least one water storage tank by the low pressure pipework is not connected to the at least one water storage tank by the conduit system. A peak pressure of water in the low pressure pipework does not exceed the consumer water pressure threshold.

Hence, in the preferred embodiment in parallel to the high pressure conduit system a low pressure pipework arrangement is provided which is designed as previously described. In particular, the low pressure pipework has preferably a minimum internal diameter exceeding 8 mm and more preferably an internal diameter between 18 and 25 mm. The use of a low pressure system in parallel to a high pressure section can, for example, be used to supply consumer equipment with continuously high water demands. Since the pipework has a considerably larger diameter a higher quantity of water can be provided in the same amount of time. Such system may, for example, be useful when consumer equipment in form of a shower is installed on an aircraft which requires continuous water supply over a long time and buffers are not feasible or in cases where high water flows are required in the direct vicinity of a water storage tank and the connection to the drinking water storage tank can be kept short and without significant constraints concerning pipe installation due to the short distance.

Preferably, the at least one pressurizer comprises a low pressure stage and a high pressure stage, wherein the low pressure stage is provided for pressurizing water fed to the high pressure stage and the low pressure section of the drinking water supply and distribution system. Though not described here in detail, the previously described embodiments of the low pressure stage may also be combined with a drinking water storage and distribution system comprising a low pressure section and a high pressure section.

In a preferred exemplary embodiment a distance of each of the at least one consumer equipment connected to the at least one storage water tank by the low pressure pipework from the at least one storage water tank is less than a distance of each of the at least one consumer equipment connected to the at least one storage water tank by the conduit system from the at least one storage water tank. In other words, only consumer equipment arranged in close distance to the drinking water storage tank is provided with water via the lower pressure section of the water supply and storage system whereas consumer equipment arranged further away from the drinking water storage tank is provided with water via the high pressure section of the water supply and storage system. Here, the distance between a drinking water storage tank and consumer equipment is the distance the water has to travel through the conduit system or the pipework, respectively.

In a preferred exemplary embodiment the low pressure pipework comprises rigid piping and it is further preferred that heater(s) are provided for heating the low pressure pipework. Preferably, the heater(s) are tape heaters.

BRIEF DESCRIPTION OF THE DRAWINGS

In the following embodiments of the disclosure herein are explained in more detail with reference to the following, example drawings.

DETAILED DESCRIPTION

Figure 1:
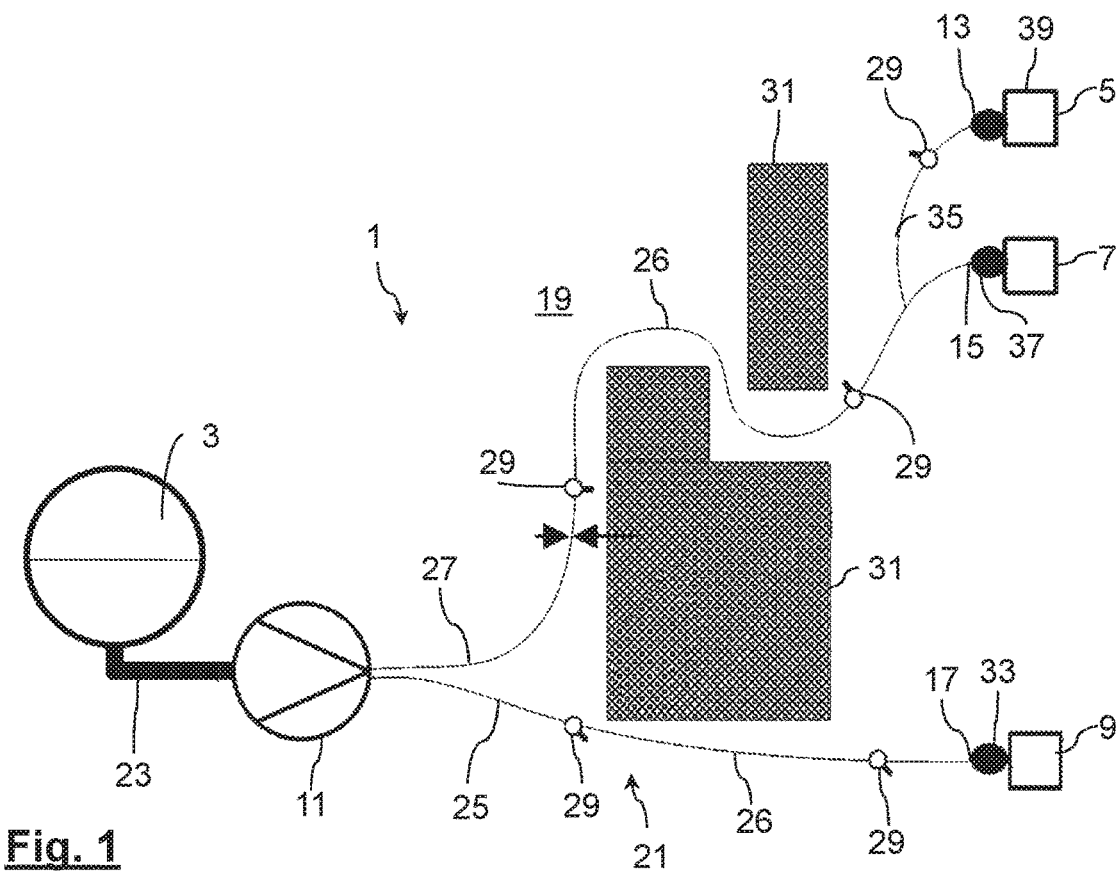
FIG. 1 is a schematic drawing of a first exemplary embodiment of a drinking water supply and distribution system installed in an aircraft.

The drinking water supply and distribution system 1 is installed in an aircraft 19 and comprises a water storage tank 3, three units of consumer equipment 5, 7, 9, a pressurizer 11 and three pressure reducers 13, 15, 17. The water supply and distribution system 1 is installed in an exemplary embodiment of an aircraft 19 which is not shown in detail. The drinking water storage tank 3 may be an unpressurized storage tank, i.e., a water tank where the water is kept at ambient pressure, or a pressurized water storage tank in which water is stored at an elevated pressure. The elevated pressure may be supplied by bleed air from the aircraft's engines.

The drinking water storage tank 3 is connected to the consumer equipment 5, 7, 9 through a conduit system 21. The conduit system 21 comprises a first connection 23 connecting the pressurizer 11 to the drinking water storage tank 3. The pressurizer 11 is provided for pressurizing water in the part of the conduit system 21 extending between the pressurizer 11 and the consumer equipment 5, 7, 9 and may be a high-pressure pump. The pressurizer 11 is provided for generating peak water pressures in the conduit system 21 exceeding a supply water pressure threshold of 100 bar and preferably exceeding a supply water pressure threshold of 150 bar. From the pressurizer 11 drinking water is fed into two branches 25, 27 of the conduit system 21. The branches 25, 27 are both directly connected to the pressurizer 11.

The branches 25, 27 are flexible plastic conduits 26, e.g., tubes or hoses, preferably made from PEEK. The inner diameter of the flexible conduits 26, i.e., their maximum free internal cross-section is 4 mm. As can be seen in FIG. 1, the branches 25, 27 are flexibly mounted in the aircraft 19 using mounting brackets 29. Since the material of the flexible conduits 26 is lightweight and the narrow cross-section of the conduits allows only small amounts of water to be held in the branches 25, 27 at any point in time, the overall weight of the high-pressure part of the conduit system 21 is low and, therefore, simple and lightweight mounting brackets 29 can be used to mount the branches 25, 27 in the aircraft 19. The conduit system 21 allows a flexible approach for supplying different consumer equipment 5, 7, 9 depending on the consumption of the consumer equipment. For example, a high consumption consumer equipment 9 may be provided with a dedicated branch 25 to allow high flow rates, whereas multiple low consumption consumer equipment 5, 9 can be connected to the same branch 27.

Further, since the branches 25, 27 are made from a flexible material, the arrangement of the conduits 26 can be easily adapted or configured to the further installation in the aircraft 19. For example, in FIG. 1 two further structures 31 are shown that are arranged inside the aircraft 19 and that obstruct the direct path from the pressurizer 11 to the consumer equipment 5, 7, 9. As can be seen in FIG. 1, the flexible material of the conduits 26 allows the conduit system 21 to be flexibly installed around the structures 31 and one of the branches 27 of the conduit system 21 even runs between the two structures 31.

The first branch 25 of the two branches 25, 27 connects the pressurizer 11 to a consumer equipment 9 in form of kitchen sink 9 installed in a galley of the aircraft 19. However, the first branch 25 is not directly connected to the kitchen sink 9 since the pressure of the water would be too high for a user. To reduce the pressure of the water down to or below an acceptable level, i.e., down to or below a consumer water pressure threshold of 2 bar, the pressure reducer 17 is installed between the first branch 25 and the consumer equipment 9. In other words, the pressure reducer 17 is associated with the consumer equipment 9. The use of a pressure reducer 17 is necessary though the 20 water pressure drops significantly with increasing distance to the pressurizer since high pressure peaks at the consumer equipment 9 need to be avoid.

The pressure reducer 17, however, does not only reduce the pressure to an acceptable level, it also includes a buffer 33. The buffer 33 stores water locally at or below the consumer water pressure threshold and advantageously provides a reserve of water for the consumer equipment 9 if water consumption at the consumer equipment 9 should peak and due to the reduced internal diameter of the branches 25, 27.

The second branch 27 connects the pressurizer 11 to a consumer equipment 7 in form of a washing basin 7 and also to a further consumer equipment 5 in form of a toilet flush 5. Both the toilet flush 5 and the washing basin 7 are part of a lavatory of the aircraft 19. The toilet flush 5 is connected to the second branch 27 via a sub-branch 35. Hence, the branches 25, 27, 35 of the conduit system 21 are formed similar to vanes or tree structure.

Between the second branch 27 and the washing basin 7 a pressure reducer 15 is arranged which similar to the pressure reducer 17 comprises a buffer 37 for locally storing water for peak consumption. Similarly, a pressure reducer 13 is arranged between the sub-branch 35 and the associated consumer equipment 5. However, this pressure reducer 17 only reduces the pressure of the water in the conduit system 21 below a consumer water pressure threshold. The consumer water pressure threshold at this consumer equipment 5 may differ from the consumer water pressure threshold required at the other consumer equipment 7, 9 and may, for example, be 4 bar instead of 2 bar. Further, this pressure reducer 13 does not comprise a buffer. Instead a buffer 39 is provided in the consumer equipment 5. The buffer 39 has the same function as the other buffers 33, 37.

The use of flexible conduits 26 for the branches 25, 27, 35 of the conduit system 21 has the advantage that the conduit system 21 does not need to be protected against freezing. If the water in the conduits 26 of the branches 25, 27, 35 freezes, the conduits 26 expand but do not burst. In addition, only small amounts of water are stored in the conduits 26 of the branches 25, 27, 35 at any point in time due to the small open cross-section of the conduits 26. Hence, even if the water in the branches 25, 27, 35 should freeze, it quickly thaws as soon as the conduits 26 are warmed up by the surrounding air above the freezing point. For example, at an environmental temperature of 10° C. the water in the branches 25, 27, 35 may thaw within 30 min without requiring additional heating.

The conduits which are used to form the branches 25, 27, 35 are made from flexible material and can, therefore, be provided as endless material. Advantageously, the conduits can be cut into the required lengths as needed during the installation process and do not need to be pre-manufactured before installation. This keeps the cost for the water supply and distribution system low. Further, advantageously the conduits of the branches 25, 27, 35 do not have to be installed with a continuous slope since it is not necessary to drain the conduits as a frost protection measure.

Figure 2:
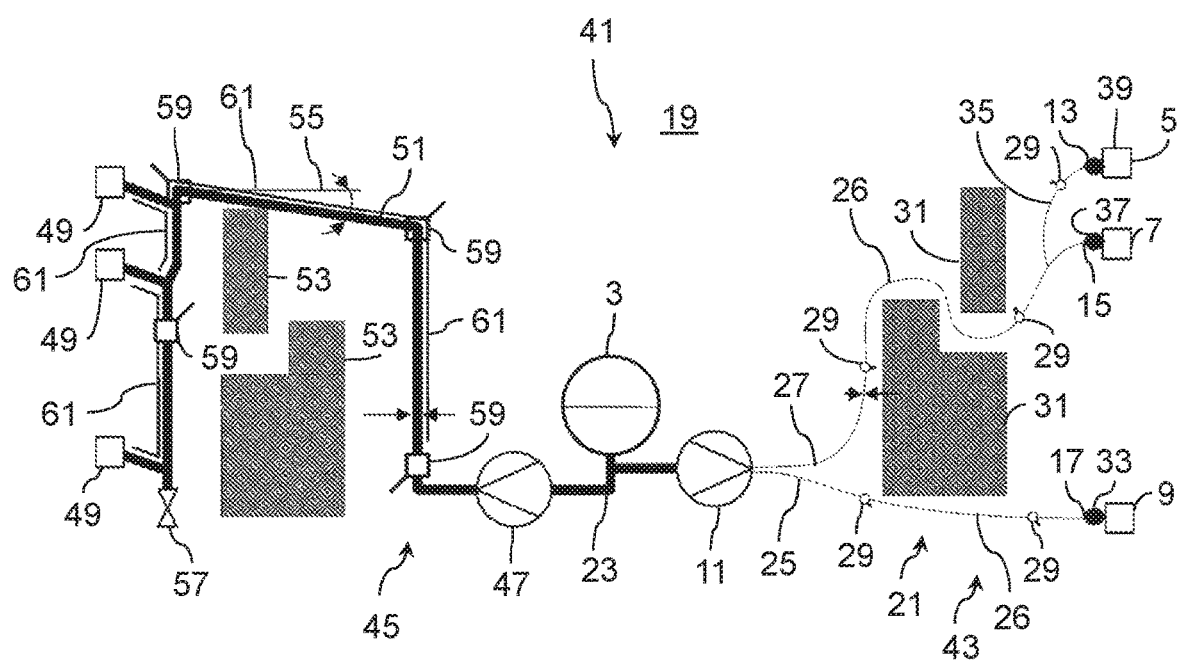
FIG. 2 is a schematic drawing of a second exemplary embodiment of a drinking water supply and distribution system installed in an aircraft.

FIG. 2 shows a second exemplary embodiment of a water supply and distribution system 41 installed in an aircraft 19. In the figures like elements will be designated with like reference numerals.

The water supply and distribution system 41 of FIG. 2 comprises a high pressure section 43 and a parallel low pressure section 45. The high pressure section 43 corresponds to the water supply and distribution system 1 shown in FIG. 1. For the sake of brevity reference is therefore made to the preceding passages describing the high pressure section 43 in detail.

The lower pressure section 45 is a conventional water supply and distribution system comprising a conventional pump 47 connected to a plurality of consumer equipment 49 via pipework 51. The pipework 51 is formed by rigid metal pipes which are carefully designed and arranged inside the aircraft 19. In particular, the pipework 51 has been designed to match the structures 53 installed in this part of the aircraft 19. As indicated by the symbol 55, the pipework 51 is installed with a continuous slope to allow drainage of the pipework 51 in the aircraft 19 via a drainage valve 57.

Water in the pipework 51 is held at a pressure corresponding to or below the consumer water pressure threshold such that no pressure reducers are required and the consumer equipment 49 can be directly connected to the pipework 51. To avoid relevant pressure drops across the length of the pipework 51, the internal diameter of the pipework 51 exceeds 18 mm and is preferably between 18 mm and 25 mm. Due to the rather wide cross section of the pipework 51, the pipework 51 is particularly suitable for supplying water to consumer equipment 49 requiring large amounts of water such as a showers or steam ovens.

However, the large diameter of the pipework 51 and given its required rigidity, it is important to use sufficiently stable mounting brackets 59. Further, since the pipework 51 is rigid, heating means 61 in form of tape heaters are provided to prevent the water in the pipework 51 from freezing.

Figure 3:
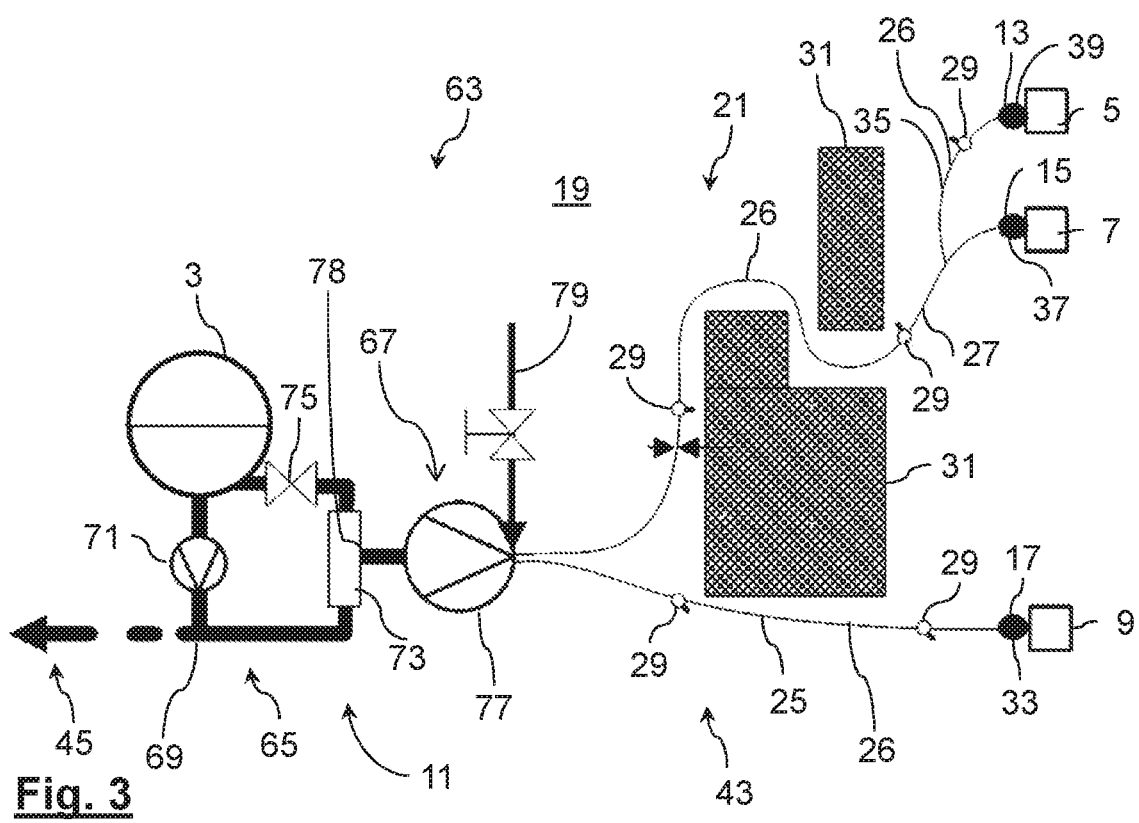
FIG. 3 is a schematic drawing of a part of a third exemplary embodiment of a drinking water supply and distribution system installed in an aircraft.

Finally, FIG. 3 shows a third embodiment of a drinking water supply and distribution system 63 installed in an aircraft 19. The system 63 largely corresponds to the previously discussed systems and, therefore, only differences will be discussed in more detail. Again, like reference numerals will be used in the figures to designate like elements.

In the embodiment in FIG. 3 the pressurizer 11 comprises a lower pressure stage 65 and a high pressure stage 67. The low pressure stage 65 is embodied as a conduit loop 69 enabling a circular flow of water in a flow direction from the drinking water storage tank 3 through a low pressure pump 71, a cross-flow filtration 73 and a flow restrictor 75 back into the drinking water storage tank 3. The low pressure pump 71 provides an initial pressurization of the water before it is fed to the high pressure pump 77 of the high pressure stage 67. At the same time the low pressure pump 71 also serves as the pressurizer for the low pressure section 45 which is not shown in FIG. 3 to keep the drawing simple.

The cross-flow filtration 73 is provided for removing particles from the drinking water before it is fed to the high pressure stage 67. This reduces the risk of damages to the high pressure stage 67. Using a cross-flow filtration 73 advantageously avoids the build-up of filter residue and increases maintenance intervals. The flow restrictor 75 is provided for reducing the circular flow in the conduit loop 69 such that more water is available for both the low and high pressure section 43, 45. The cross-filtration 73 also serves as a feed point 78 of the high pressure stage 67.

The embodiment of FIG. 3 also includes a connection 79 to a source of pressurized air (not shown). The pressurized air can be used for forcing water out of the conduit system 21 if required, for example, in case the aircraft shall be stored at temperatures below the freezing point. The water in the conduit system 21 may be drained through the respective consumer equipment 5, 7, 9. Such a drainage system could, for example, be automatically activated if the aircraft is operate on ground under cold weather conditions with e.g. 'doors open' so that internal temperature can fall below freezing point.

While at least one exemplary embodiment of the invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft with a drinking water supply and distribution system, the drinking water supply and distribution system comprising:
   at least one water storage tank;
   at least a first consumer equipment and a second consumer equipment;
   a conduit system connecting the at least one water storage tank to at least the first consumer equipment;
   a high pressure section formed by the conduit system;
   a low pressure section comprising a low pressure pipework connecting the at least one water storage tank to at least the second consumer equipment, wherein the second consumer equipment, which is connected to the at least one water storage tank by the low pressure pipework of the low pressure section, is not connected to the at least one water storage tank by the conduit system, a pressure of water within the low pressure section being less than a pressure of water within the high pressure section;
   at least one pressurizer connected at an inlet to the conduit system between the at least one water storage tank and at least the first consumer equipment, the at least one pressurizer comprising a low pressure stage and a high pressure stage, the low pressure stage being connected to the high pressure stage to provide pressurized water to the high pressure stage and the low pressure section, such that water supplied from the at least one water storage tank to at least the first consumer equipment is configured to pass through the low pressure stage, which provides an initial pressurization of the water before the water is provided to the high pressure stage, wherein a pressure of water within the low pressure stage is less than a pressure of water within the high pressure stage; and
   at least one pressure reducer;
   wherein the at least one pressurizer is provided for pressurizing water in the conduit system,
   wherein a peak pressure of water in the conduit system exceeds a supply water pressure threshold,
   wherein the conduit system comprises flexible conduits having a maximum internal diameter of less than 8 mm,
   wherein the at least one pressure reducer is installed between the first consumer equipment and the conduit system configured to supply water to the first consumer equipment,
   wherein the first consumer equipment is associated with one of the at least one pressure reducer, wherein the at least one pressure reducer is provided for reducing the pressure of water supplied by the conduit system at or above the supply water pressure threshold to the first consumer equipment such that the pressure does not exceed a consumer water pressure threshold, and
   wherein the supply water pressure threshold exceeds the consumer water pressure threshold.

2. The aircraft according to claim 1, wherein at least one of the at least one pressure reducer comprises a buffer, wherein the buffer of the at least one pressure reducer is provided for storing water supplied by the conduit system from the at least one water storage tank and wherein water stored in the buffer of the at least one pressure reducer is supplied to the first consumer equipment associated with the at least one pressure reducer at a pressure not exceeding the consumer water pressure threshold.

3. The aircraft according to claim 1, wherein no mechanism is provided for actively heating the flexible conduits of the conduit system.

4. The aircraft according to claim 1, wherein the consumer water pressure threshold is 8.6 bar.

5. The aircraft according to claim 1, wherein the consumer water pressure threshold is 2.75 bar.

6. The aircraft according to claim 1, wherein the supply water pressure threshold is 50 bar.

7. The aircraft according to claim 1, wherein the supply water pressure threshold is 100 bar or 150 bar.

8. The aircraft according to claim 1, wherein the flexible conduits of the conduit system have a maximum internal diameter of 7 mm.

9. The aircraft according to claim 8, wherein the flexible conduits of the conduit system have a maximum internal diameter of 3 mm.

10. The aircraft according to claim 1, wherein the conduit system comprises a drainage valve and is connected to a high pressure gas source, wherein pressurized gas from the high pressure gas source can be fed into the conduit system for draining the conduit system.

11. The aircraft according to claim 1, wherein the high pressure stage comprises a high pressure pump.

12. The aircraft according to claim 1, wherein the low pressure stage is formed by a low pressure pump and a conduit loop, wherein the conduit loop is configured to allow a circular flow in a flow direction from the drinking water storage tank through the low pressure pump into the drinking water storage tank and wherein the high pressure stage of the at least one pressurizer branches off from the conduit loop at a feed point arranged in the flow direction between the low pressure pump and the drinking water storage tank.

13. The aircraft according to claim 12, wherein the low pressure stage comprises a flow restrictor, wherein the flow restrictor is arranged in the conduit loop in the flow direction behind the feed point for restricting flow of water in the conduit loop between the feed point and the drinking water storage tank.

14. The aircraft according to claim 1, wherein the low pressure stage comprises filtration for filtering the drinking water before the drinking water is fed from the low pressure stage to the high pressure stage.

15. The aircraft according to claim 1, wherein:
   the consumer water pressure threshold is no more than 8.6 bar;
   the supply water pressure threshold is at least 50 bar; and
   the at least one pressure reducer is configured to reduce a water pressure at the first consumer equipment from the supply water pressure threshold of at least 50 bar to the consumer water pressure threshold of no more than 8.6 bar.

16. The aircraft according to claim 1, comprising at least a third consumer equipment and a fourth consumer equipment, wherein:
   the conduit system comprises a first branch connecting the first consumer equipment and the at least one pressurizer as a dedicated branch;
   the conduit system comprises a second branch connecting the third consumer equipment and the fourth consumer equipment to the at least one pressurizer;
   the first consumer equipment being a high consumption consumer equipment that requires a higher operating flow rate than an operating flow rate of both the third consumer equipment and the fourth consumer equipment.

17. The aircraft according to claim 16, wherein the third consumer equipment is connected to a third consumer equipment pressure reducer, which is directly connected to the second branch, wherein the fourth consumer equipment is connected to a fourth consumer equipment pressure reducer, which is connected directly to a sub-branch that is connected directly to the second branch, and wherein the first and second branches are connected directly to the at least one pressurizer.

18. The aircraft according to claim 16, wherein the first consumer equipment comprises a kitchen sink in a galley of the aircraft, wherein the third consumer equipment comprises a washing basin in a lavatory of the aircraft, and wherein the fourth consumer equipment comprises a toilet in the lavatory of the aircraft.

19. The aircraft according to claim 16, wherein at least one of the first, third, and fourth consumer equipment comprises a buffer for storing water supplied by the conduit system from the at least one water storage tank, wherein water is stored in the buffer of the at least one consumer equipment at a pressure not exceeding the consumer water pressure threshold.

20. An aircraft with a drinking water supply and distribution system, the drinking water supply and distribution system comprising:
at least one water storage tank;
at least a first consumer equipment and a second consumer equipment;
a conduit system connecting the at least one water storage tank to at least the first consumer equipment;
a high pressure section formed by the conduit system;
a low pressure section comprising a low pressure pipework connecting the at least one water storage tank to at least the second consumer equipment, wherein the second consumer equipment, which is connected to the at least one water storage tank by the low pressure pipework of the low pressure section, is not connected to the at least one water storage tank by the conduit system, a pressure of water within the low pressure section being less than a pressure of water within the high pressure section;
at least one pressurizer connected at an inlet to the conduit system between the at least one water storage tank and at least the first consumer equipment, the at least one pressurizer comprising a low pressure stage and a high pressure stage, the low pressure stage being connected to the high pressure stage to provide pressurized water to the high pressure stage and the low pressure section, such that water supplied from the at least one water storage tank to at least the first consumer equipment is configured to pass through the low pressure stage, which provides an initial pressurization of the water before the water is provided to the high pressure stage, wherein a pressure of water within the low pressure stage is less than a pressure of water within the high pressure stage; and
at least one pressure reducer;
wherein the at least one pressurizer is provided for pressurizing water in the conduit system,
wherein a peak pressure of water in the conduit system exceeds a supply water pressure threshold,
wherein the conduit system comprises flexible conduits having a maximum internal diameter of less than 8 mm,
wherein each of the at least one consumer equipment is associated with one of the at least one pressure reducer, wherein the at least one pressure reducer is provided for reducing the pressure of water supplied by the conduit system to an associated consumer equipment such that the pressure does not exceed a consumer water pressure threshold,
wherein the supply water pressure threshold exceeds the consumer water pressure threshold, and
wherein the at least one pressure reducer is configured to reduce a water pressure at a corresponding one of the at least one consumer equipment from a supply water pressure threshold of at least 50 bar to the consumer water pressure threshold of no more than 8.6 bar.

* * * * *